United States Patent [19]

Erwin

[11] 4,419,080

[45] Dec. 6, 1983

[54] METHOD AND APPARATUS FOR TEACHING GRAMMAR

[75] Inventor: Paul R. Erwin, Dallas, Tex.

[73] Assignee: Class Press, Inc., Dallas, Tex.

[21] Appl. No.: 335,225

[22] Filed: Dec. 28, 1981

[51] Int. Cl.$^3$ .............................................. G09B 1/00
[52] U.S. Cl. .................................................... 434/172
[58] Field of Search ................ 434/167, 170, 172, 178

[56] References Cited

U.S. PATENT DOCUMENTS

| | | | |
|---|---|---|---|
| 3,197,891 | 8/1965 | Pierce | 434/167 X |
| 3,235,976 | 2/1966 | Elliott et al. | 434/170 |
| 3,389,480 | 6/1968 | Holland | 434/170 X |
| 3,482,333 | 12/1969 | Trager, Jr. | 434/170 X |
| 4,171,816 | 10/1979 | Hunt | 434/167 X |

*Primary Examiner*—William H. Grieb

*Attorney, Agent, or Firm*—Bernard A. Reiter

[57] ABSTRACT

Disclosed are an apparatus and method for teaching students to recognize and understand the function of various parts of speech. The apparatus includes a plurality of parts of speech cards corresponding to the various parts of speech. Each part of speech card includes a first side having information thereon that provides a clue as to the part of speech, and a second side having thereon the name of the part of speech and instructions directing the student to mark a word corresponding to that part of speech in a particular manner. The method includes matching to each word in a sentence a first side of a part of speech card and then reversing the matched parts of speech cards, thereby to identify the parts of speech. The method also includes the steps of marking the words of the sentence in the manner directed by the second sides of the parts of speech cards.

2 Claims, 11 Drawing Figures

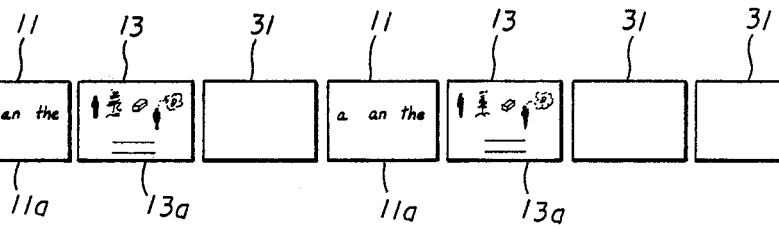
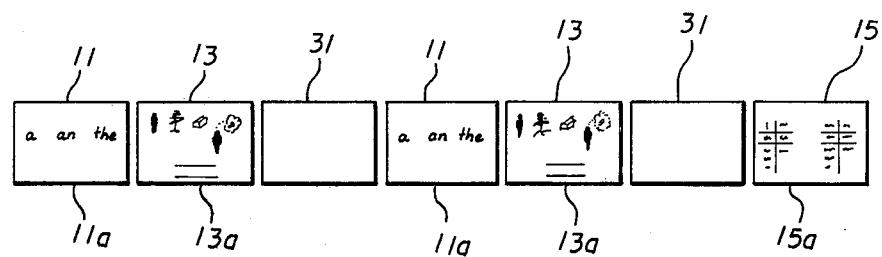
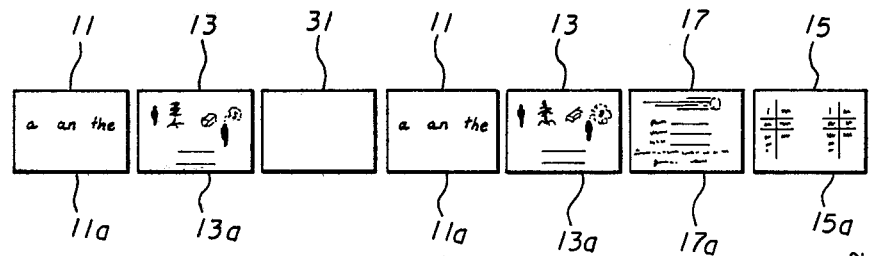
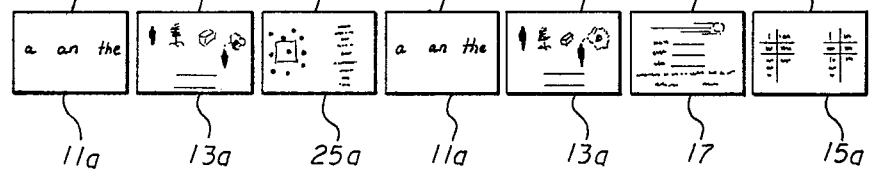

METHOD AND APPARATUS FOR TEACHING GRAMMAR

BACKGROUND OF THE INVENTION

A. Field of the Invention

The present application relates generally to apparatus and methods for teaching, and more particularly to a method and apparatus for teaching students to recognize and understand the function of the various parts of speech in a sentence.

B. Description of the Prior Art

One of the primary steps in obtaining literacy is mastery of basic grammar, including parts of speech, prepositional phrases and their functions, and noun functions. Without such mastery, effective oral and written expression are virtually impossible.

The traditional method of teaching grammar is a process known as diagraming. In diagraming, the words or phrases of a sentence are placed upon a diagram according to certain rules. Most students are able to apply the rules of diagraming and thereby become proficient in recognizing and using the various gramatical forms. However, some students are baffled by the diagraming process and never learn grammar.

Students who are unable to learn grammar by the traditional methods, present particular problems to teachers. Teachers of language probably never encountered any difficulty in learning grammar, and are therefore unable to understand how it feels to be baffled by grammar. Moreover, language teachers are probably bored or impatient with teaching parts of speech because they feel that the students should have mastered such basics before arriving at their class. Teachers would rather concentrate on other and more esoteric language functions. Additionally, children who have mastered the parts of speech are bored with repetition and those who have not mastered the parts of speech are predisposed to find its study distasteful. Grammar study tends to be enjoyable for neither teachers nor students.

A number of apparatus and methods have been developed for attempting to teach grammar in ways that are more effective and less painful than the traditional methods. For example, U.S. Pat. No. 3,389,480 discloses a method of teaching the parts of speech that includes assigning a basic color to each part of speech and then coloring cards having words thereon with the color assigned to the part of speech corresponding to that word and adding to the card a secondary color that corresponds to the part of speech that the word modifies. In the method of the '480 patent colors are arbitrarily assigned.

Other examples of methods and apparatus for teaching grammar in non-traditional ways are disclosed in U.S. Pat. No. 4,171,816; U.S. Pat. No. 3,197,891; U.S. Pat. No. 3,235,976; and U.S. Pat. No. 3,482,333. In the methods of the foregoing U.S. Patents, names of parts of speech are assigned to words. The names are assigned simply by memory; there is no emphasis upon the functional nature of parts of speech.

Accordingly, it is an object of the present invention to provide a method and apparatus for teaching grammar that overcomes the shortcomings of the prior art.

It is a further object of the present invention to provide a method and apparatus for teaching grammar that emphasizes the functional nature of parts of speech, rather than mere memorization of the names of parts of speech.

It is yet a further objection of the present invention to teach parts of speech, noun functions and prepositional phrases to students in a thorough, pleasant and effective manner.

It is yet a further object of the present invention to provide a method and apparatus for teaching grammar that promote positive feelings of success in what has often traditionally been a tedious and troublesome subject.

SUMMARY OF THE INVENTION

Briefly stated, the foregoing and other objects and advantages of the present invention are accomplished by the apparatus and method of the present invention. The apparatus includes a plurality of sets of parts of speech cards. There is one set for each part of speech. On the first side of each card is a functional representation that gives the student a cue as to what a part of speech does in the context of the language. The other side of the card has on it the name of the part of speech and a direction that indicates how to mark a word that corresponds to a particular part of speech.

The method includes first the step of matching the first sides of the parts of speech cards to the words of a sentence. The student compares sequentially every word of the sentence with his cards. When he finds a card that represents the function of the word in the sentence, the student matches that card to the word. The student proceeds sequentially word by word through the sentence until a card has been matched to each word. Then, the student reverses the cards thereby to display the names of the parts of speech in association with each word of the sentence. The student then marks the words of the sentence in the manner indicated on the second side of each corresponding card, thereby to reinforce his or her understanding.

The method of the present invention is used to teach grammar in a way that progresses in small steps. The student is first provided with parts of speech cards corresponding only to articles and nouns. The student is also provided with a set of blank cards. As the student compares the words of the sentence to his or her cards, he or she will be able to identify only articles and nouns. Those words that do not correspond with articles or nouns, will be matched to blank cards. After the student has mastered articles and nouns, additional parts of speech cards will be introduced one at a time until the student has mastered all parts of speech.

BRIEF DESCRIPTION OF THE DRAWINGS

FIG. 3 is a illustrative sentence that may be used in practicing the method of the present invention.

FIG. 4 is a plan view of the first sides of the article, noun, and blank cards of the present invention arranged according to the method of the present invention to correspond to the words of the sentence of FIG. 3.

FIG. 5 illustrates the sentence of FIG. 3 with the articles and nouns marked according to the method of the present invention.

FIG. 6 is a plan view of the article, noun, pronoun and blank cards of the present invention arranged according to the method of the present invention to correspond to the words of the sentence of FIG. 3.

FIG. 7 illustrates the sentence of FIG. 3 with the articles, nouns, and pronoun marked in accordance with the method of the present invention.

FIG. 8 is a plan view of the article, noun, pronoun, verb and blank cards of the present invention arranged according to the method of the present invention to correspond to the words of the sentence of FIG. 3.

FIG. 9 illustrates the sentence of FIG. 3 with the articles, nouns, pronoun, and verb marked in accordance with the method of the present invention.

FIG. 10 is a plan view of the article, noun, pronoun, verb, and preposition cards of the present invention arranged according to the method of the present invention to correspond to the words of the sentence of FIG. 3.

FIG. 11 illustrates the sentence of FIG. 3 with the articles, nouns, pronoun, verb, and preposition marked in accordance with the method of the present invention.

DESCRIPTION OF THE PREFERRED EMBODIMENT

Figure 1:
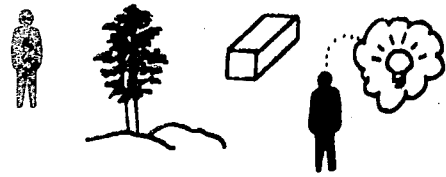
FIG. 1 is a plan view of the first sides of the parts of speech cards of the present invention.
Figure 1:
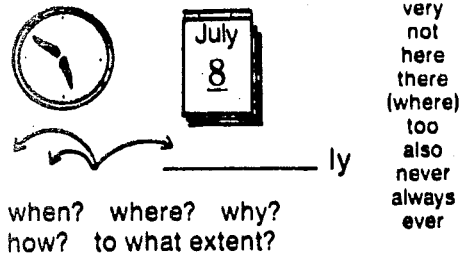
Figure 1:
Figure 1:
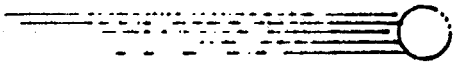
Figure 1:
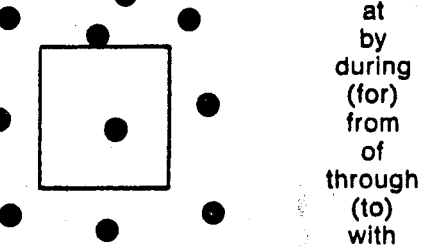
Figure 1:
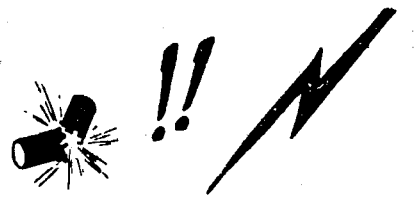
Figure 2:
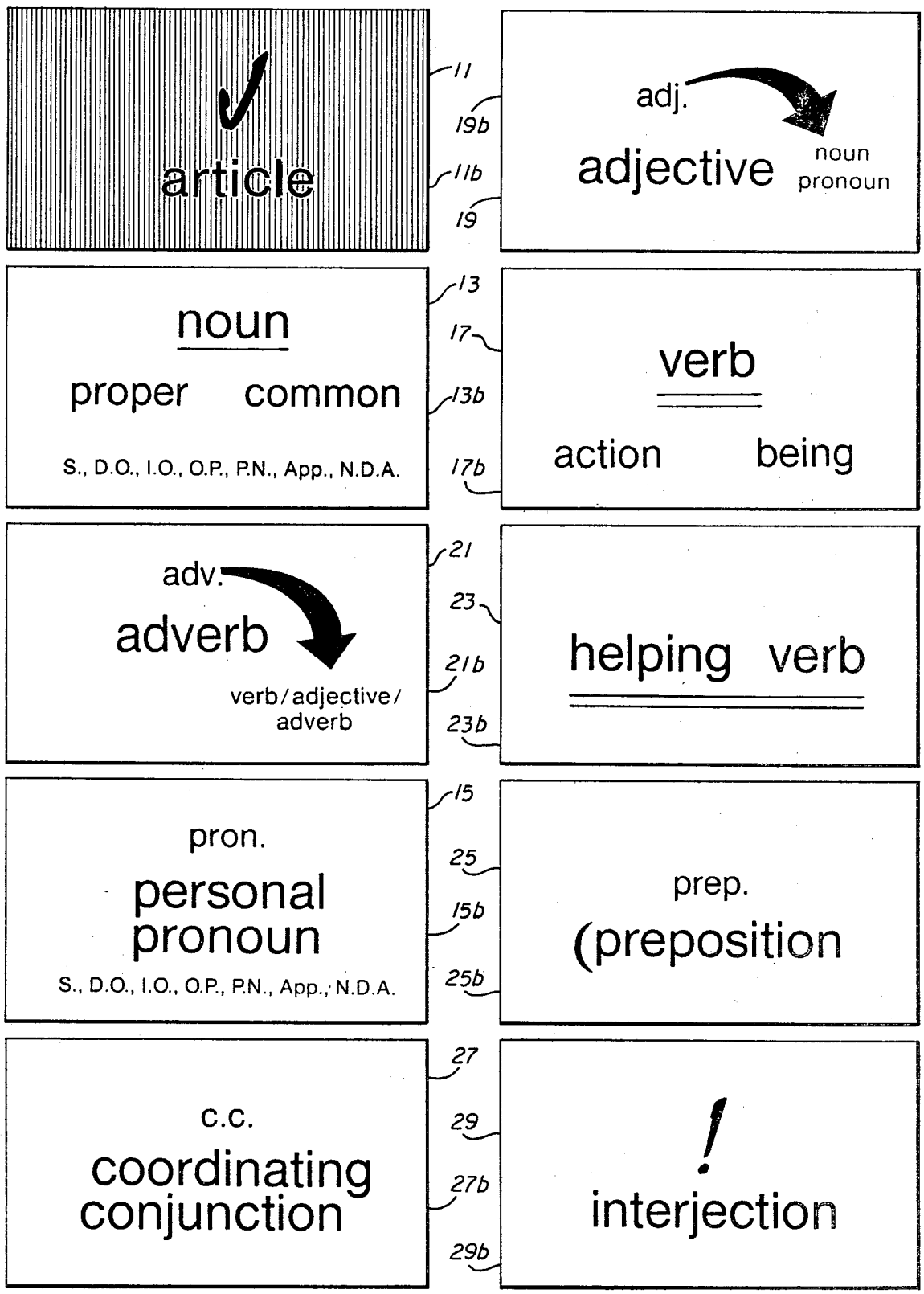
FIG. 2 is a plan view of the second sides of the parts of speech cards of the present invention.

Referring now to the drawings, and first to FIGS. 1 and 2, the apparatus of the present invention includes a plurality of sets of the parts of speech cards corresponding to the parts of speech, which are articles, nouns, personal pronouns, verbs, adjectives, adverbs, prepositions, coordinating conjunctions, and interjections. The article card 11 has a first side 11a, shown in FIG. 1, and a second side 11b, shown in FIG. 2. First side 11a of article card 11 has printed thereon the three articles: "a", "an", and "the". Second side 11b of article card 11 includes the word "article" with a checkmark thereover, which indicates the name of the part of speech and gives the student a direction to place a checkmark over an article when he or she finds an article in a sentence, as will be described in greater detail hereinafter.

The noun card 13 includes a first side 13a, as shown in FIG. 1, and a second side 13b as shown in FIG. 2. First side 13a of noun card 13 has thereon pictures of a man, a tree, a solid object, which may represent a brick, and a figure of a man and a lightbulb. The figures on front side 13a of noun card 13 represent that a noun is a person, place, thing or idea. First side 13a of noun card 13 also includes the word "two" followed by a line and the word "the" followed by a line, which indicate that it makes sense to say, for example, "two men" or "the man". Second side 13b of noun card 13 includes the word "noun", which is underlined. Thus, second side 13b of noun card 13 indicates the name of the part of speech, and directs that a noun found in a sentence should be underlined. Second side 13b of noun card 13 also includes the words "proper" and "common", which indicate that nouns may be either proper or common. Additionally, second side 13b of noun card 13 includes the initials "S.,D.O.,I.O.,O.P.,P.N.,APP. N.D.A.", which indicate that nouns may be subjects, direct objects, indirect objects, objects of the preposition, predicate nominatives, appositives and nouns of direct address.

Pronoun card 15 includes a first side 15a, as shown in FIG. 1, and a second side 15b, as shown in FIG. 2. First side 15a of personal pronoun card 15 includes a pair of diagrams that set forth the personal pronouns. Second side 15b of personal card 15 includes the name personal pronoun with the abreviation "pron." thereabove. Second side 15b of personal pronoun card 15 thus directs the student to mark any personal pronoun that he or she may find in a sentence with the designation "pron". Second side 15b of noun card 15 also includes the initials set forth on second side 13b of noun card 13, which indicates that a personal pronoun may likewise serve as a subject, direct object, indirect object, object of the preposition, predicate nominative, a positive, or noun of direct address.

Verb card 17 includes a first side 17a, as shown in FIG. 1, and a second side 17b, as shown in FIG. 2. First side 17a of verb card 17 includes a representation of a ball traveling at high speed, which indicates to the student that verbs show action. First side 17a of verb card 17 also includes the words "I will", "yesterday I", and "I have", each followed by a blank line, which indicate to the student that the insertion of the proper tense of a verb upon the blank line will result in a phrase that makes sense. For example, the phrases, "I will shoot", "yesterday I shot", and "I have shot", each make sense, whereas, for example, "I will tree" ordinarily would not make sense. Second side 17a of noun card 17 also includes a listing of the forms of the verb "to be", which indicates that verbs also show states of being. Second side 17b of verb card 17 includes the word "verb" with a double line therebelow. This indicates the name of the part of speech and directs the student to put a double line below the verbs that he or she finds in a sentence. Second side 17b of verb card 17 also incudes the words "action" and "being", which remind the student that verbs show either action or being.

Adjective card 19 includes a first side 19a, as shown in FIG. 1, and a second side 19b, as shown in FIG. 2. First side 19a of adjective card 19 has thereon fanciful drawing figures that indicate functionally the types of words that are adjectives: e.g. large, small, tall, short, happy, sad, and two. First side 19a of adjective 19 also includes the phrases "the__person" and "the __object", which indicate that an adjective is a word that makes sense when placed in those phrases. For example, the phrases "the happy person" and "the shiney object" both make sense, whereas "the car object" does not. First side 19a of adjective 19 also includes the questions "which?", "what kind of?", "how many?", and "how much?", which indicate that adjectives provide answers to the foregoing questions. Second side 19b of adjective card 19 includes the name "adjective" with the abreviation "Adj." thereabove. An arrow is directed from the abreviation "Adj." to the words "noun" and "pronoun". Thus, second side 19b of adjective card 19 directs the student to mark any adjective that he or she may find in a sentence, with the abreviation "Adj." and draw an arrow to the noun or pronoun that the adjective modifies.

Adverb card 21 includes a first side 21a, as shown in FIG. 1, and a second side 21b, as shown in FIG. 2. First side 21a of adjective card 21 includes drawing figures of a calendar page and a face of a clock, which indicate that adverbs frequently refer to time by answering the question "when?". First side 21a of adverb card 21 also includes a figure with a plurality of arrows emanating from a common source, which are intended to indicate that adverbs can often be moved to other positions in the sentence and still make sense. First side 21a of adverb card 21 also includes the figure "__ly", which indicates that adverbs usually end in "ly". First side 21a of adverb card 21 also includes a list of the words "very, not, here, there, (where), to, also, never, always, and ever", which the students are instructed always to call adverbs. These words very infrequently can be other parts of speech, but these rare constructions are avoided for the purposes of the present invention. Second side 21b of adverb card 21 includes the name of the part of speech with the abreviation "Adv." thereover. An arrow is drawn from the abreviation "Adv." to the words "verb/adjective/adverb". Second side 21b of adverb card 21 thus directs the student to mark the adverbs that he or she may find in a sentence with the abrieviation "Adv." and draw an arrow from the adverb to the verb, adjective, or adverb that is modified.

Helping verb card 23 includes a first side 23a, as shown in FIG. 1, and a second side 23b, as shown in FIG. 2. First side 23a of helping verb card 23 includes a list of words that function in most contexts as helping verbs. Second side 23b of helping verb card 23 includes the name of the part of speech with two lines therebelow. Second side 23b of helping verb card 23 thus directs the student to mark the helping verbs that he or she may find in the sentence with a double underline. It will be noted that the marking system of the present invention does not distinguish between helping verbs and being verbs or action verbs. For purposes of teaching the parts of speech according to the method of the present invention, elaborate differentiation is not necessary. It is more important that the student understand that helping verbs are closely related to action verbs or being verbs. However, later the student will need to identify the main verb in a sentence when determining noun functions.

Preposition card 25 includes a first side 25a, as shown in FIG. 1, and a second side 25b, as shown in FIG. 2. First side 25a of preposition card 25 includes a figure that comprises a box with dots arranged in and around the box, which suggests to or reminds the student that words that indicate position or spacial relationship are prepositions, as for example, in, on, over, beneath, beside, above, or under. First side 25a of preposition card 25 also includes a list, including at, by, during, from, of, through, and with, that are almost always prepositions. The list of words on first side 25a of preposition card 25 also includes the words for and to, which are in parenthesis, to indicate that in certain contexts, they are prepositions. Second side 25b of preposition card 25 includes the name of the part of speech with the abreviation "prep." thereabove. Second side 25b of preposition card 25 also includes an open parenthesis before the word "preposition". Thus, second side 25b of preposition card 25 directs the student to mark the prepositions that he or she may find in the sentence with the abreviation "prep." and to draw an open parenthesis immediately preceding the preposition in the sentence. The student will be instructed, when learning noun and pronoun functions to draw the closed parenthesis immediately after the object of the preposition, thereby to set off the prepositional phrase by parentheses.

Coordinating conjunction card 27 includes a first side 27a, as shown in FIG. 1, and a second side 27b, as shown in FIG. 2. First side 27a of preposition card 27 includes a list of the most common coordinating conjunctions, including an, but, for, yet, or, nor, and semicolon. "For" is in parenthesis because it is also listed on front side 25a of preposition card 25. Students sometimes have difficulty in determining whether "for" is a preposition or a coordinating conjunction. The best rule for differentiating is to remember that "for" is a preposition, in context, if it has an object. First side 27a of preposition card 25 also includes a diagram, including two spaced apart blanks with a pair of arrows pointing in opposite directions above the blanks and the word "compounds" below the blanks. This diagram indicates to the student that compounds are two grammatical units linked by a coordinating conjunction. Second side 27b of coordinating conjunction card 27 includes the name of the part of speech with the initials "c.c." thereabove. Second side 27b of coordinating conjunction card 27 thus directs the student to mark the initials "c.c." above the coordinating conjunctions that he or she may find in the sentence.

Interjection card 29 includes a first side 29a and a second side 29b. First side 29a of interjection card 29 includes drawings of an exploding firecracker, double exclamation points, and a lightening bolt, which remind the student that interjections are words that indicate emotion, for example "wow!", "ouch!", or "golly!", noise, for example "bam!", "zap!", or "boom!", or "speed!" for example "whoosh!", or "zip!". Second side 29b of interjection card 29 includes the name of the part of speech with an exclamation point thereabove. Thus, second side 29b of interjection card 29 directs the student to mark an exclamation point over any interjection that he or she may find in the sentence.

With the above described parts of speech cards, the student may, according to the method of the present invention, become proficient in identifying the parts of speech and the noun and pronoun functions. According to the method of the present invention the parts of speech are taught in the following sequence: (1) article; (2) noun; (3) personal pronoun; (4) verb; (5) helping verb; (6) adjective; (7) adverb; (8) preposition (and object); (9) coordinating conjunction; and (10) interjection. The noun and pronoun functions are taught in the following sequence: (1) object of prepositions; (2) subject; (3) direct object; (4) predicate nominative; (5) indirect object; (6) appositive; and (7) noun of direct address.

Referring to FIG. 3, there is illustrated the sentence "The man in the movie frightened me." The sentence of FIG. 3 includes articles, nouns, a pronoun, a verb, and a preposition, and is useful in illustrating the method of the present invention. The sentence of FIG. 3 may be displayed to the students on a blackboard, or by means of an overhead projector, or by any other method for displaying words or pictures to students. The students may also be provided with a work sheet having the sentence of FIG. 3 printed thereon.

Articles and nouns are taught first and simultaneously. The students are given a set of article cards 11, a set of noun cards 13, and a set of blank cards, designated by the numeral 31. The student is directed to compare sequentially each word in the sentence of FIG. 3 with the information on the first sides 11a and 13a of the cards before him or her, and then to match one card with each word of the sentence. The first word of the sentence of FIG. 3 is "the", which the student would find on first side 11a of article card 11. The student would thus match the first word and the sentence of FIG. 3 with an article card 11, as shown in FIG. 4. The student would then go to the next word of the sentence of FIG. 3, which is "man". The student would be able to match to the word "man" first side 13a of noun card 13 because man is a person and it makes sense to say "two men" and "the man". The student would then go in sequence to the next word in the sentence of FIG. 3, which is "in". The student would be unable to match an article card 11 or a noun card 13 with the word "in".

"In" is not listed on first side 11a of article card 11. Neither is "in" a person, place, or thing. It does not make sense to say "two ins" or "the in". Accordingly, the student would simply match the word "in" with a blank card 31. The student would then move to the next word of the sentence of FIG. 3, which is "the", which the student would match with an article card 11. The student would then move to the next word of the sentence in FIG. 3, which is "movie". The student would find that "movie" in the sentence is a person, place or thing and that it makes sense to say "two movies" and "the movie". Thus, the student would match the word "movie" with a noun card 13. The student would then move to the next word of the sentence of FIG. 3, which is "frightened". The student would compare the word "frightened" with first sides 11a and 13a, but would find that the word "frightened" does not fit. Accordingly, he or she would match a blank card 31 to the word "frightened". The student would then proceed to the final word of the sentence of FIG. 3, which is "me", which again he or she would be unable to match with an article card 11 or a noun card 13. Thus, again, the student would match to the word "me" a blank card 31, whereupon the student would have before him or her the arrangement of cards shown in FIG. 4.

After the students have arranged their cards according to the method of the present invention, as shown in FIG. 4, the teacher would preferably go through the reasoning involved in arranging the cards. Thereafter, the students would be directed to reverse their cards such that second sides 11b and 13b of article cards 11 and noun cards 13, respectively, are face up before them. The student would then recognize that the word "the" at both occurrences in the sentence of FIG. 3 is an article. The student would also recognize that the words "man" and "movie" in the sentence of FIG. 3 are nouns. It is important to emphasize to the student that a word functions as a part of speech in some context, and that the same words may function as different parts of speech in different context. For example, "man" in the sentence of FIG. 3 is a noun; however, the word "man" in another sentence, as for example "Man the lifeboats!", is not a noun, and is in fact a verb.

After having reviewed the reasoning involved in matching the cards to the words, the students would be directed to mark the sentence of FIG. 3 in accordance with the directions on second sides 11b and 13b of article cards 11 and noun cards 13, respectively. Referring to FIG. 5, the student would mark the word "the" at each occurrence with a checkmark to indicate that the word "the" is an article. The student would mark the words "man" and "movie" with a single underline, to indicate that those words are nouns. The student would not mark the words "in", "frightened", or "me", because those words are neither articles nor nouns. The students would repeat the foregoing exercises in identifying articles or nouns in a number of sentences until they became proficient.

Referring now to FIG. 6, there is shown an arrangement of article cards 11, noun cards 13, blank cards 31 and a personal pronoun card 15, according to the method of the present invention corresponding to the words of the sentence of FIG. 3. In the example of FIG. 6, the student has been given, in addition to the article cards 11, noun cards 13 and blank cards, a personal pronoun card 15. The student has proceeded sequentially through the first six words of the sentence of FIG. 3 and has applied the above recited reasoning to match the cards. However, upon reaching the last word of the sentence of FIG. 3, which is "me", the student finds that that word can be matched with the information on first side 15a of personal pronoun card 15. After having arranged the cards as set forth in FIG. 6, the student reverses cards 11, 13 and 15, and marks the sentence of FIG. 3 in the manner directed by second sides 11b, 13b, and 15b of article card 11, noun card 13, and personal pronoun card 15, as is shown in FIG. 7.

Similarly, FIG. 8 illustrates the arrangement of cards after verb card 17 has been introduced. Again, working with the sentence of FIG. 3, the student would apply the above recited analysis to the first five words of FIG. 3. Upon reaching the sixth word, which is "frightened", the student would find that that word satisfies the conditions of first side 17a of verb card 17, in that it shows action or state of being and it makes sense to say "I will frighten", "yesterday I frightened", and "I have frightened". The student would thus match verb card 17 to the word "frightened". The student would then, again, match personal pronoun card 15 to the final word of the sentence of FIG. 3, which is "me". The student would then reverse the cards of FIG. 8 and mark the sentence of FIG. 3 in the manner directed by second sides 11a, 13a, 15a, and 17a of article card 11, noun card 13, personal pronoun card 15, and verb card 17, as is illustrated in FIG. 9.

As a final illustration, and to complete the analysis of the sentence of FIG. 3, the student would be given in addition to article cards 11, noun cards 13, personal pronoun cards 15, and verb cards 17, a set of preposition cards 25. The student would again match an article card 11 to the word "the" and a noun card 13 to the word "man". However, upon reaching the third word of the sentence of FIG. 3, which is "in", the student, upon perusal of his or her cards, would find that "in" indicates positional or spacial arrangement, as illustrated in front side 25a of preposition card 25, and thus is a preposition. The student would thereafter continue the analysis in the manner recited above and complete the exercise. The student would then reverse the cards of FIG. 10 and mark the sentence of FIG. 3 in the manner directed by the second sides of the cards, as is shown in FIG. 11.

The remaining parts of speech, including adjectives, adverbs, helping verbs, coordinating conjunctions, and interjections, would be introduced one at a time in similar fashion. The students would apply the analysis outlined above to make an arrangement of cards corresponding to the words of the sentence. After the students had mastered the parts of speech, the noun and pronoun functions would be introduced and subsequently mastered.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A teaching method wherein a student learns to recognize and understand the function of the parts of speech in a sentence, which comprises the steps of:
providing to the student a plurality of sets of parts of speech cards, each set having a part of speech card having a first side having a representation that indicates the function of a part of speech and a second side having the name of the part of speech, the function of which is indicated on the first side, and a direction to mark the part of speech in the sentence in a particular manner;
matching to each word of the sentence a first side of the part of speech card that corresponds to the word;
reversing the matched parts of speech cards whereby the second sides of the matched parts of speech cards correspond to the words of the sentence with the name of the part of speech corresponding to a word in the sentence that functions in that part of speech;
and marking the words of the sentence in the manner of the direction on the corresponding matched second side of the part of speech card.

2. A teaching method wherein a student learns to recognize and understand the function of a certain part of speech in a sentence, wherein that sentence consists of words that perform the functions of that certain part of speech and other words that perform the function of other parts of speech, which comprises the steps of:
providing to the student a set of parts of speech cards, each part of speech card having a first side having a representation that indicates to the student the function of the certain part of speech and a second side having the name of the certain part of speech, and a direction to mark the word that functions as the certain part of speech in a certain manner;
providing the student with a set of cards being blank on both sides;
matching the first sides of the parts of speech cards and the blank cards to the words of the sentence such that the parts of speech cards correspond to the words of the sentence that function in the certain part of speech and the blank cards correspond to the words of the sentence that function in the other parts of speech;
reversing the matched parts of speech cards whereby the second sides of the matched parts of speech cards display the name of the certain part of speech;
and marking the words of the sentence in the manner of the direction on the corresponding matched part of speech card.

* * * * *